No. 765,712. PATENTED JULY 26, 1904.
J. SCHWARTZMAN.
COMBINATION BED, LOUNGE, CRIB, OR THE LIKE.
APPLICATION FILED APR. 5, 1904.
NO MODEL. 7 SHEETS—SHEET 1.
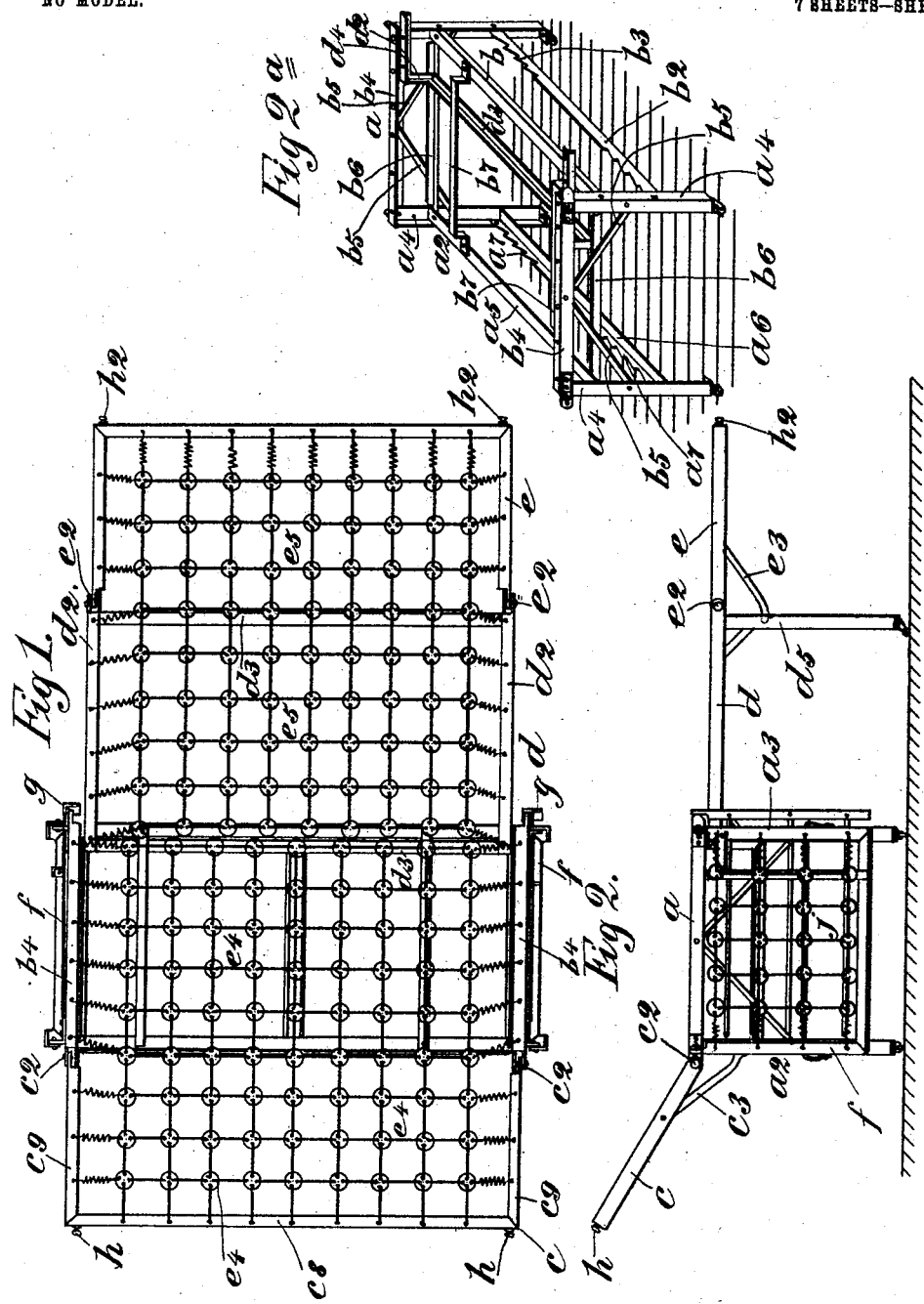
WITNESSES
O. P. Williams
F. A. Stewart
INVENTOR
Jacob Schwartzman
BY
Edgar Tate & Co
ATTORNEYS

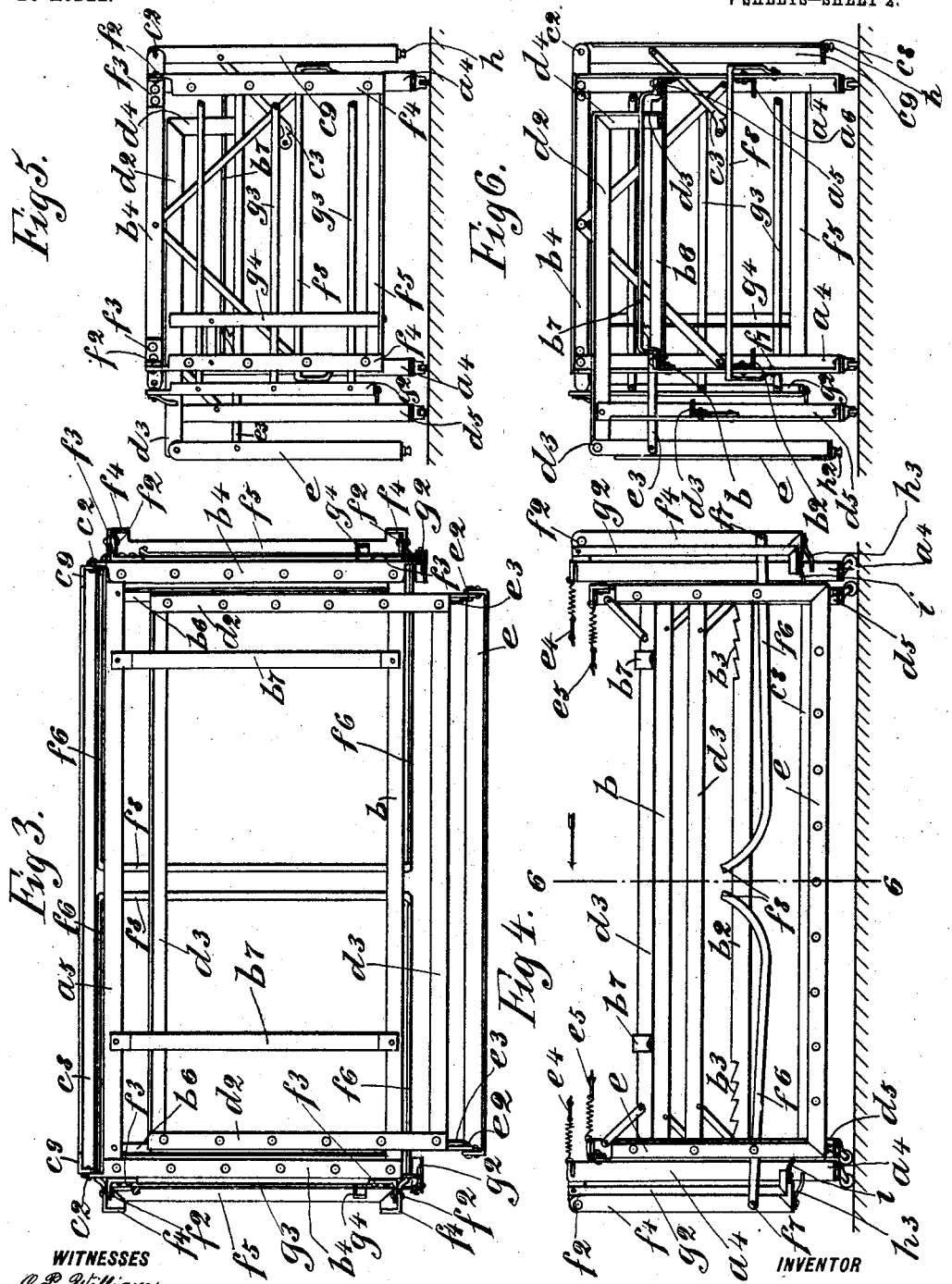

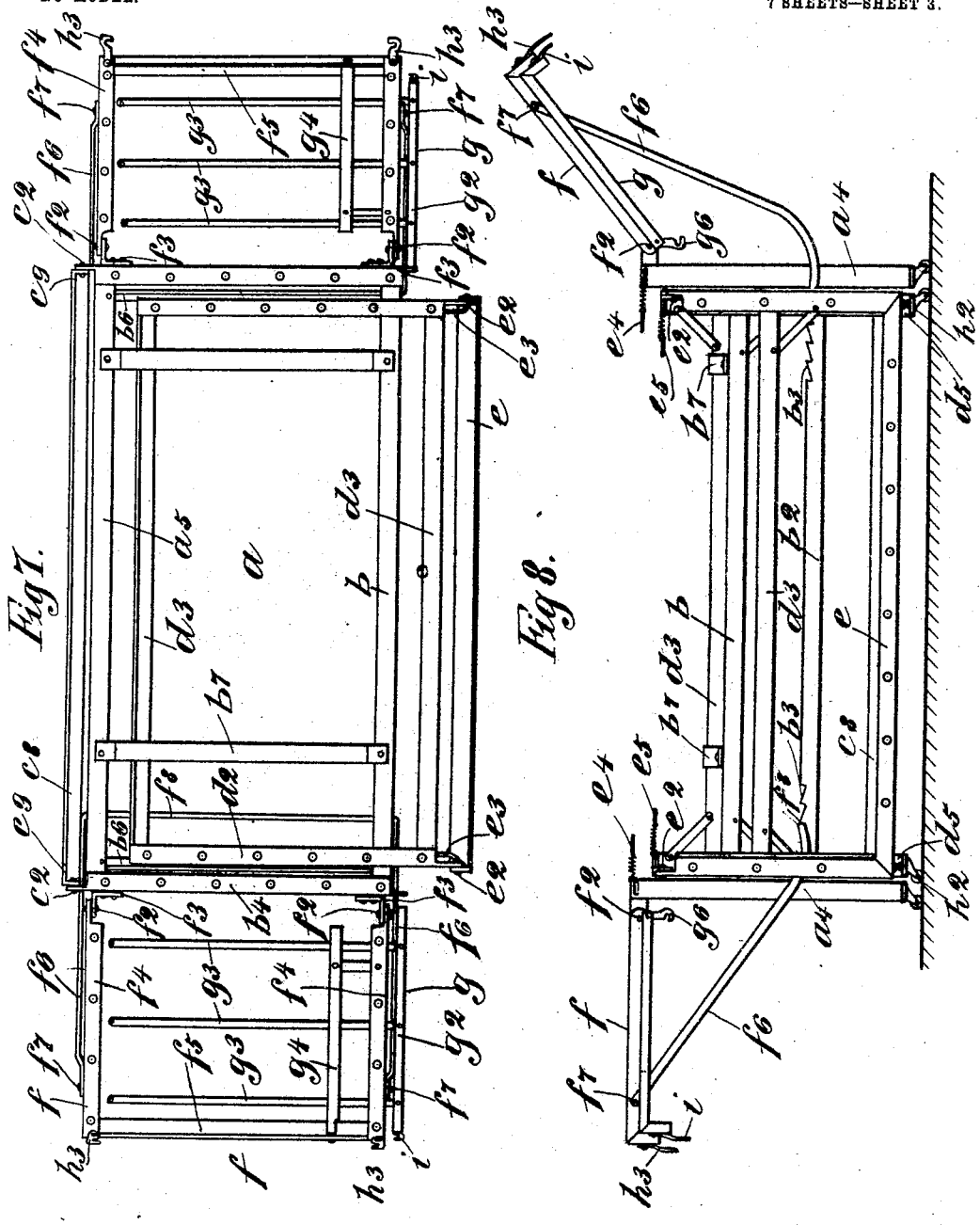

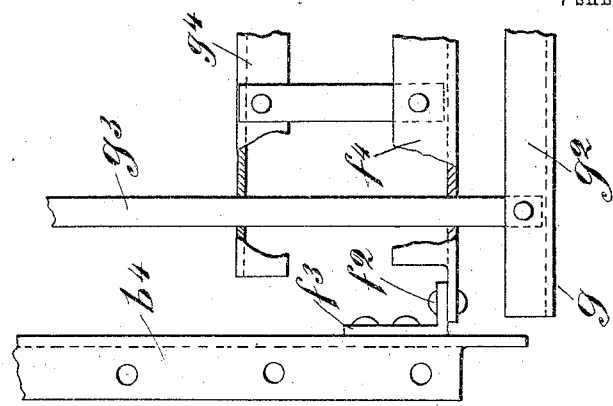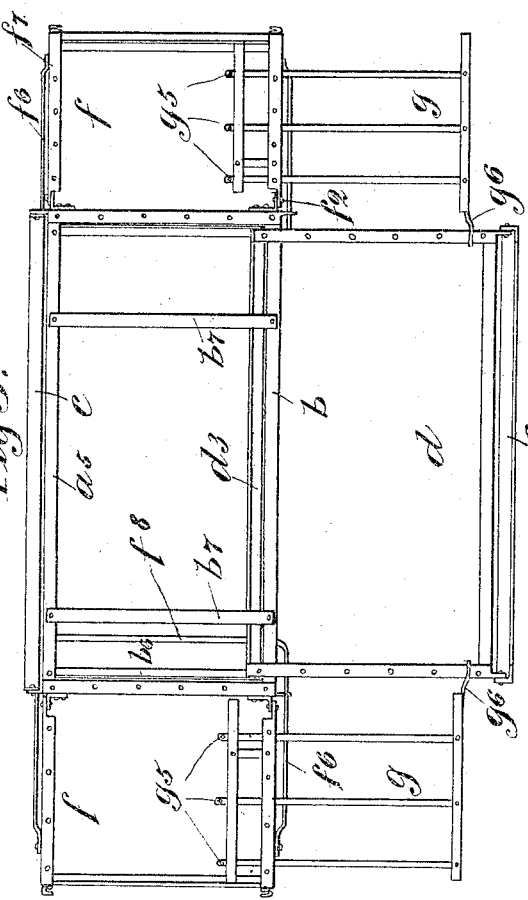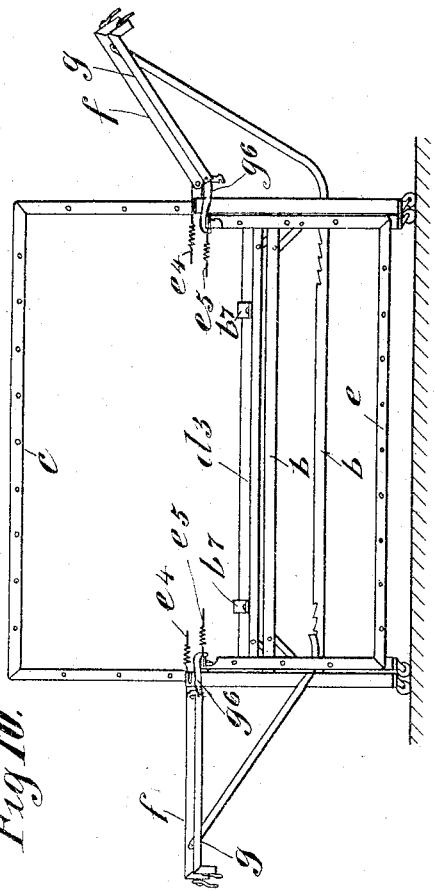

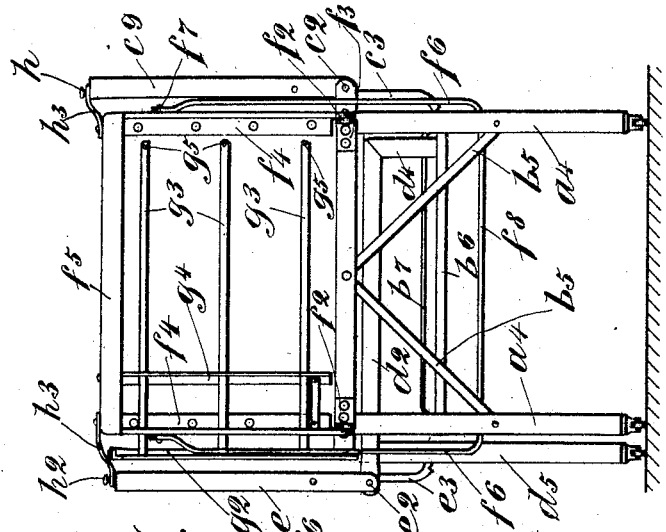
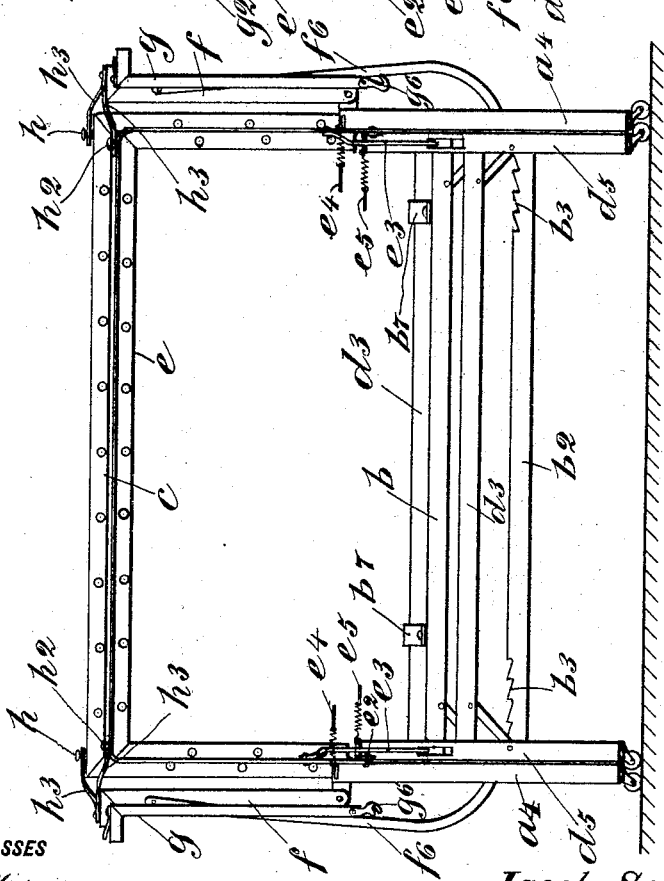

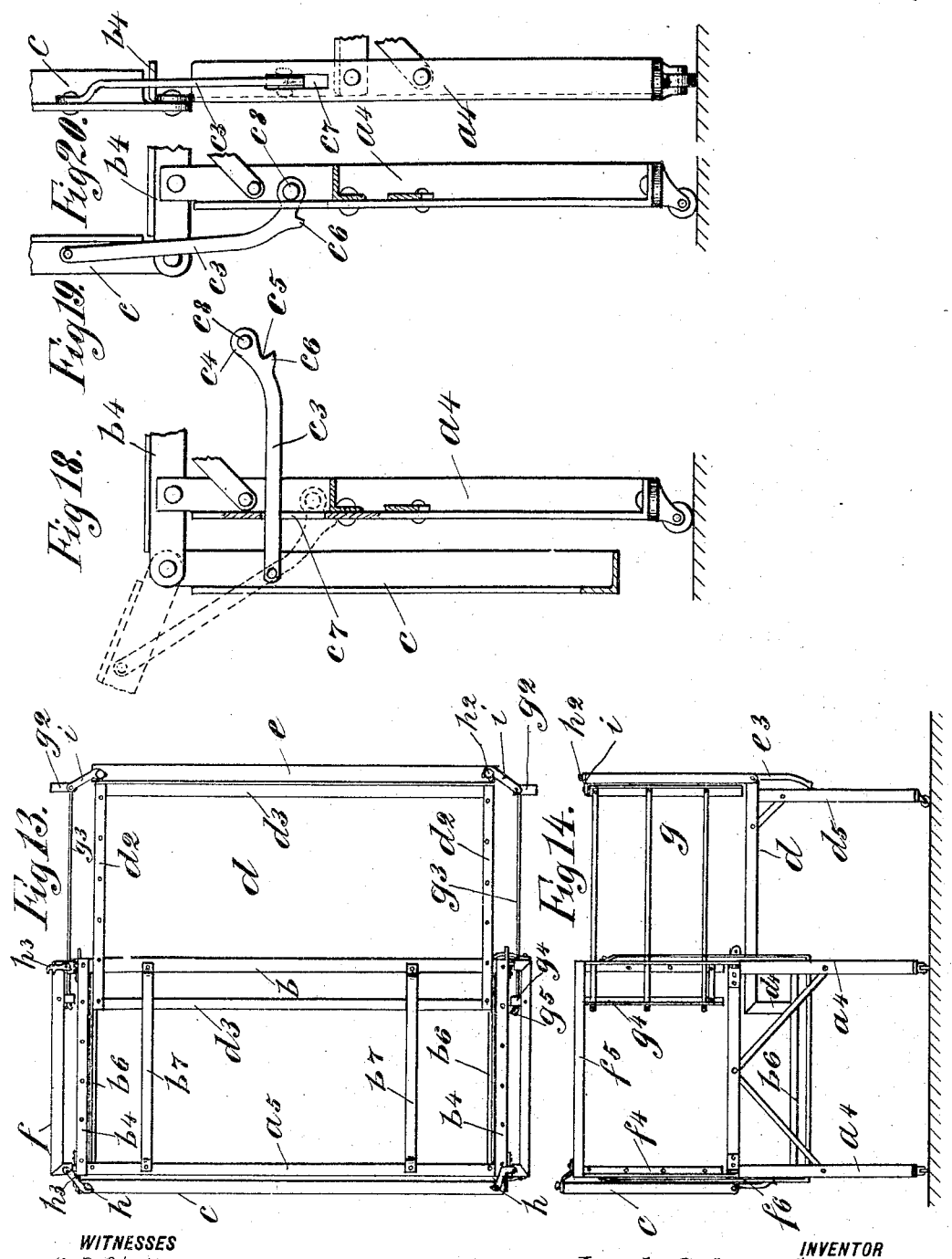

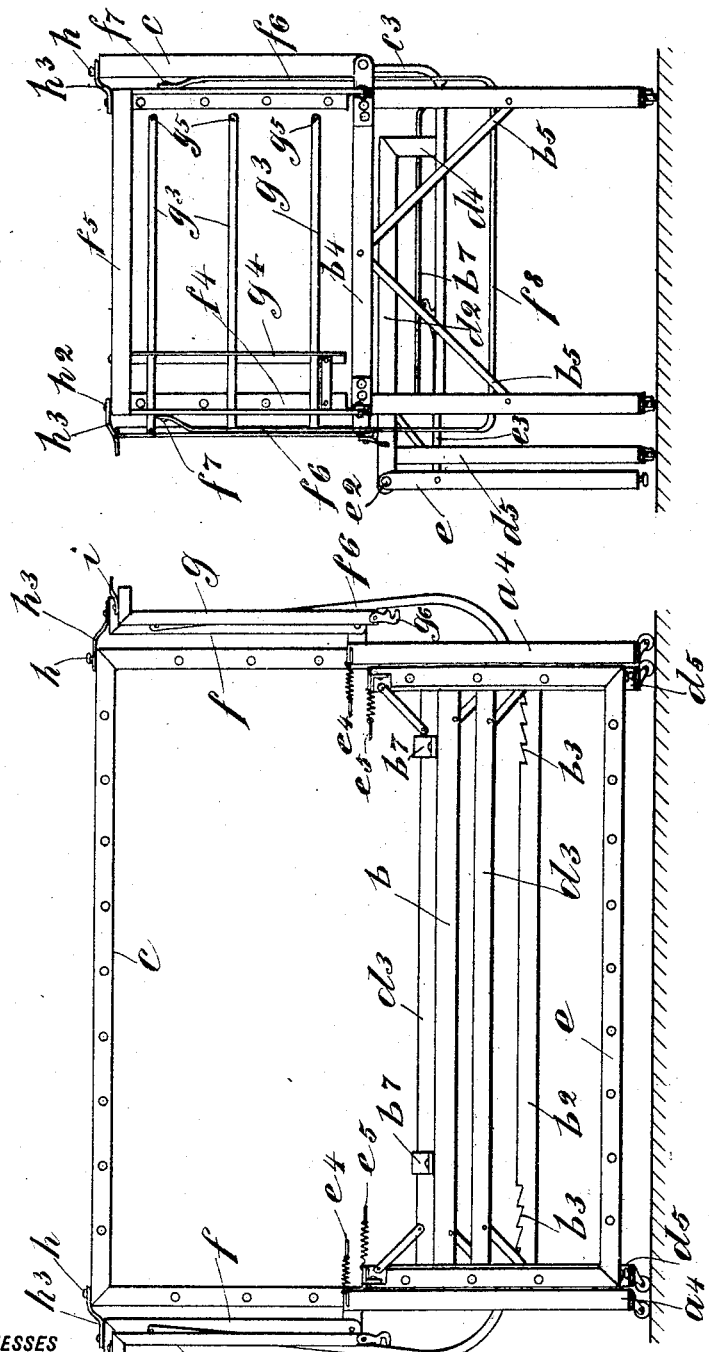

No. 765,712. Patented July 26, 1904.

UNITED STATES PATENT OFFICE.

JACOB SCHWARTZMAN, OF NEW YORK, N. Y., ASSIGNOR OF TWO-THIRDS TO JOHN MARCUS AND MORRIS MARCUS, OF NEW YORK, N. Y.

COMBINATION BED, LOUNGE, CRIB, OR THE LIKE.

SPECIFICATION forming part of Letters Patent No. 765,712, dated July 26, 1904.

Application filed April 5, 1904. Serial No. 201,665. (No model.)

*To all whom it may concern:*

Be it known that I, JACOB SCHWARTZMAN, a citizen of the United States, residing at New York, in the county of New York and State of New York, have invented certain new and useful Improvements in Combination Beds, Lounges, Cribs, or the Like, of which the following is a specification, such as will enable those skilled in the art to which it appertains to make and use the same.

The object of this invention is to provide an improved combination-bed which may be used either as a bed, a couch, a lounge, a sofa, a double lounge, and a crib or similar device; and with this and other objects in view the invention consists in an article of the class specified constructed as hereinafter described and claimed.

The invention is fully disclosed in the following specification, of which the accompanying drawings form a part, in which the separate parts of my improvement are designated by suitable reference characters in each of the views, and in which—

Figure 1 is a plan view showing my improvement with the parts in position for use as a bed; Fig. 2, a side view thereof; Fig. $2^a$, a perspective view of the main frame thereof; Fig. 3, a plan view showing the parts in position for use as a couch; Fig. 4, a front view thereof; Fig. 5, an end view thereof; Fig. 6, a transverse section on the line 6 6 of Fig. 4; Fig. 7, a plan view showing the parts in position for use as a lounge; Fig. 8, a front view thereof; Fig. 9, a plan view of the device, showing the parts in position for use as a double lounge; Fig. 10, a front view thereof; Fig. 11, a front view of the device, showing the parts in position for use as a crib; Fig. 12, an end view thereof; Fig. 13, a plan view showing the parts in position for use as a double crib; Fig. 14, an end view thereof; Fig. 15, a front view showing the parts in position for use as a sofa; Fig. 16, an end view thereof; Fig. 17, a sectional plan view of a part of the construction as shown in Fig. 9; Fig. 18, a sectional inside view of a corner of telescopic frame which I employ as a part of the main frame of the device; Fig. 19, a view similar to Fig. 18, showing the parts in a different position; and Fig. 20, a front view of the construction shown in Fig. 19.

In the practice of my invention I provide a main rectangular and oblong frame $a$, a perspective view of which is given in Fig. $2^a$, and for the purpose of this description one side of this frame will be called the "back" side thereof and the opposite side the "front" side thereof, and these sides are respectively designated by the reference characters $a^2$ and $a^3$.

The main frame $a$ comprises corner-posts $a^4$, which are preferably composed of angle-iron or other metal, and the back side thereof is provided with a horizontal bar $a^5$, arranged at a predetermined distance below the tops of the posts $a^4$ and beneath which is a supplemental horizontal bar $a^6$, having ratchet-teeth $a^7$ in the opposite end portions thereof. The front side of the frame $a$ is also provided with a top horizontal bar $b$, similar to and in the same position as the bar $a^5$, and a bottom horizontal bar $b^2$, similar to and in the same position as the bar $a^7$, and the opposite end portions of which are provided with ratchet-teeth $b^3$.

The end portions of the main frame $a$ in the form of construction shown are composed of transverse end bars $b^4$, secured to the tops of the posts $a^4$, and braces $b^5$, connected with said posts and said bars $b^4$, and connected with the horizontal top side bars $a^5$ and $b$ adjacent to each end are transverse angle-bars $b^6$, and said top horizontal side bars $a^5$ and $b$ are also connected at a predetermined distance from the bars $b^6$ by transverse keeper-bars $b^7$.

Hinged to the back side $a^2$ of the main frame is a supplemental back frame $c$, this connection being made at $c^2$, and said frame $c$ is adapted to be held in the position shown in Fig. 2 and to be lowered into a vertical position, as shown in Fig. 18, and to be raised into an upright position, as shown in Figs. 19 and 20, and this supplemental frame $c$ is provided at each end thereof with a pivoted supporting-arm $c^3$, (shown in detail in Figs. 18 to 20,) and the free ends of the supporting-arms $c^3$ are provided with curved heads $c^4$, in the under side of which is a recess $c^5$, forming a projecting tooth $c^6$, and the heads $c^4$ of the arms $c^3$ are passed through vertical slots $c^7$ in the posts $a^4$, and said heads are provided with transverse pins $c^8$, which prevent the disconnection of said arms from said posts, and in order to hold the supplemental frame $c$ in the position shown in Fig. 2 and in dotted lines in Fig. 18 the arms $c^3$, or the teeth $c^6$ thereof, engage with the bottoms of the slots $c^7$, as is also shown in dotted lines in Fig. 18. The supplemental frame $c$, which is hinged to the back top portion of the main frame, is composed of an outer member $c^8$, parallel with the main frame, and end members $c^9$, and these members are composed of angle-iron or other metal and may be formed integrally, if desired.

Mounted in the top portion of the main frame is a telescopic frame $d$, composed of parallel end members $d^2$ and parallel side members $d^3$, said frame being adapted to be drawn out in front of the main frame, as shown in Figs. 1 and 2, or to be slid into said frame, as shown in Figs. 3, 5, and 6. The inner side member $d^3$ of the frame $d$ is connected with the inner ends of the end members $d^2$ by depending supplemental end members $d^4$, parts of the end members $d^2$ of the telescopic frame $d$ and the inner side member $d^3$ thereof being shown in perspective in Fig. 2ᵃ.

The telescopic frame $d$ is placed in position before the transverse keepers $b^7$ of the main frame are secured in position, and these transverse keepers $b^7$ hold the inner side of the telescopic frame in position, and said inner side of the telescopic and the depending end members $d^4$ at the ends of said frame rest on and are movable on the end bars $b^6$ of the main frame. The telescopic frame is also provided at its outer corners with legs $d^5$, and the outer side member $d^3$ of said frame is secured to the legs $d^5$ at a point below the tops thereof in a horizontal plane below the inner side member $d^3$ thereof, as clearly shown in Fig. 6. Hinged to the outer corners of the said telescopic frame is a supplemental frame member $e$, the hinge connection between the parts or frames $d$ and $e$ being at $e^2$, and said supplemental frame member $e$ is provided at its ends with pivoted arms $e^3$ exactly the same as the arms $c^3$ of the hinged back frame member $c$ and operating in connection with the legs $d^5$ in the same manner as the arms $c^3$ operate in connection with the main-frame posts $a^4$; but the arms $e^3$ are intended to hold the supplemental frame member $e$ in horizontal position, as shown in Figs. 1 and 2.

The main frame and the hinged back frame $c$ are provided with a continuous bed-spring $e^4$, adapted to fold on a line between the hinges $c^2$ of the back frame $c$, and the telescopic frame $d$ and supplemental frame member $e$ are also provided with a continuous bed-spring $e^5$, which is adapted to fold on a line with the hinges $e^2$.

The foregoing description covers all the parts of my improved combination-bed which relate to a bed proper; but in order to adapt the device for use as a lounge I provide the construction shown in Figs. 7 and 8, in which supplemental end frames $f$ are hinged to each end of the main frame at the top thereof, as shown at $f^2$, this connection being made by means of angle-pieces $f^3$, secured to the main frame. The supplemental end frames $f$ are composed of end members $f^4$, which are hinged at $f^2$, and an outside member $f^5$, secured to the end members $f^4$, and pivoted to the end members $f^4$ are yoke-shaped supports $f^6$, the side portions of which are pivoted to the frame members $f^4$ at $f^7$, and the cross-head portions $f^8$ extend into the main frame and engage the teeth $a^7$ on the main-frame bar $a^6$ and the teeth $b^3$ on the main-frame bar $b^2$ to hold the frame members $f$ in the desired position, and in Figs. 7 and 8 one of these frame members is shown in a horizontal position and the other in a slightly-raised position, and as thus constructed the device is adapted for use as a lounge.

It will be observed that the bed-springs are not shown in Figs. 7 and 8, except a part thereof in Fig. 8, these springs being omitted in order to show the framework more clearly, and this is true of all the other figures of the drawings except Figs. 1 and 2.

For the purpose of converting the device into a double lounge, as shown in Figs. 9 and 10, the supplemental end frames $f$ are provided with auxiliary sliding frames $g$, consisting of bars $g^2$ and parallel rods $g^3$, connected therewith, three of which are shown, but any desired number of which may be employed, and these rods $g^3$ pass through the end members of the supplemental end frames $f$ and through a transverse support $g^4$, secured to said supplemental frame members, and the sliding frames $g$ are adapted to be drawn out, as shown in Figs. 9 and 10, parallel with the ends of the telescopic frame $d$ when the latter is drawn out, and the rods or bars $g^3$ are provided at their inner ends with hooks or pins $g^5$ to prevent said sliding frames from being withdrawn entirely from the supplemental frame members $f$, and the ends of the frame members $f$, through which the rods or bars $g^3$ pass, and the supports $g^5$ form a firm support for said sliding frames and guides for the rods or bars $g^3$, and the sliding frames $g$ are also preferably provided with hooks $g^6$, which are pivoted thereto and which are adapted to engage the telescopic frame $d$ and which aid to support and properly hold the sliding frames $g$.

In forming the device into a couch, as shown in Figs. 3, 4, 5, and 6, the telescopic frame $d$ is slid into the main frame and the supplemental frame member $e$, hinged to the telescopic frame $d$, is allowed to hang in a vertical position, as shown in said figures. The sliding frames $g$ are moved into the supplemental end frame members $f$, and said frame members $f$ are also allowed to hang in a vertical position, all that is necessary to accomplish this result being to raise the inner end portions of the yoke-shaped supports $f^6$, so that the cross-heads $f^8$ thereof will be disconnected from the ratchet-teeth of the bars $a^6$ and $b^2$ of the main frame.

When it is desired to use the device as a bed, the hinged back frame $c$ is raised into the position shown in Figs. 1 and 2 and the telescopic frame $d$ drawn out, and the supplemental frame member $e$, hinged to the telescopic frame member $d$, is raised into a horizontal position.

When it is desired to use the device as a lounge, the supplemental end frames $f$ are raised, as shown in Figs. 7 and 8. In Fig. 7 the telescopic frame $d$ is shown slightly withdrawn from the main frame, so as to better show the construction; but when the device is used as a lounge the telescopic frame $d$ is inserted entirely into the main frame or as far as it will go.

When it is desired to use the device as a double lounge, the parts are moved into the position shown in Figs. 9 and 10.

When the device is to be used as a crib, the telescopic frame $d$ is slid into the main frame, and the supplemental frame member $e$, hinged to the telescopic frame, is raised into a vertical position. The back frame member $c$ is also raised into a vertical position, and the supplemental end frame members $f$ are also raised into a vertical position, thus forming a box-shaped receptacle. The back frame $c$ is provided with buttons $h$, and the supplemental frame member $e$, hinged to the telescopic frame $d$, is also provided with buttons $h^2$, while the hinged supplemental end frame members $f$ are provided with corresponding hooks $h^3$, and the hooks $h^3$ on the end frame members $f$ are engaged with the buttons $h$ and $h^2$ on the frame members $c$ and $e$, and in this way the frame members $c$, $e$, and $f$ when in an upright position are securely connected at their corners.

If it is desired to convert the device into a double crib, as shown in Figs. 13 and 14, supposing the parts to be in the position shown in Figs. 11 and 12, the telescopic frame $d$ is drawn out, and the sliding frames $g$ are also drawn out from the end frame member $f$ at the ends of the main frame, and the said frames $g$ are provided with hooks $i$, which engage the buttons $h^2$ on the frame member $e$.

When the parts are in the position shown in Figs. 13 and 14, it will be apparent that they may be changed to the bed form, as shown in Figs. 1 and 2, whenever desired or into the lounge form (shown in Figs. 7 and 8) or into the double-lounge form (shown in Figs. 9 and 10) or couch form, (shown in Figs. 3 to 6, inclusive,) and in Figs. 15 and 16. I have shown the parts of my improved combination-bed in position for use as a sofa, and for this purpose the hinged back frame $c$, which is hinged to the back side of the main frame, at the top thereof, is raised into an upright position. The end frame members $f$, with the sliding frame members $g$ telescoped therein, are also raised into an upright position, the telescopic frame $d$ being slid into or telescoped in the main frame, and the frame member $e$ hangs therefrom in front of said frame. In this position of the parts said frame members $e$ and $f$ are connected at the top by the hooks $h^3$ and buttons $h$, and are thus held in a rigid upright position.

The end frame members $f$, which are hinged to the top end portions of the main frame, are provided with bed-springs or similar springs $j$, similar to the springs $e^4$ and $e^5$, (shown in Fig. 1,) and it will be understood that all these springs may be covered or upholstered and all the frame members except the sliding frame members $a^3$, and said sliding frame members $a^3$ when in use may be provided with a mattress or mattresses or with any suitable covering, and that part of said sliding frame members $g$ which is always exposed may also be covered or upholstered.

All the parts or frames, including the main frame $a$, the hinged back frame $c$, the telescopic front frame $d$, the supplemental frame $e$, hinged thereto, and the end frames $f$, hinged to the main frame, are preferably composed of angle-iron or other metal; but this form may be varied or modified, as desired.

It will thus be seen that I provide an article of the class specified which may be used for any of the purposes named herein and which may be quickly, easily, and conveniently converted from one form into another, and various changes in and modifications of the construction herein described may be made without departing from the spirit of my invention or sacrificing its advantages, and I reserve the right to make all such alterations therein as fairly come within the scope of the invention.

Having fully described my invention, what I claim as new, and desire to secure by Letters Patent, is—

1. In a device of the class described, a main rectangular and oblong frame, a supplemental frame member hinged to the back thereof at the top thereof, supplemental end frame members hinged to the opposite ends thereof at the top thereof, a telescopic frame mounted in the main frame member at the top thereof and adapted to be drawn out through the front thereof, and a supplemental frame member hinged to the front edge of the telescopic frame member, substantially as shown and described.

2. In a device of the class described, a main oblong and rectangular frame, a supplemental frame member hinged to the back thereof at the top thereof, supplemental end frame members hinged to the ends thereof at the top thereof, said frame members being provided with bed-springs, and means for holding said frame members in an upright position, said main frame being also provided with a telescopic frame which is adapted to be drawn out from the front side thereof, and a supplemental frame member hinged to the front edge of the telescopic frame, means for holding said telescopic frame member and the supplemental frame member hinged thereto in a horizontal position, and means for holding the last-named supplemental frame member in an upright position when the telescopic member is within the main frame, substantially as shown and described.

3. In a device of the class described, a main oblong and rectangular frame, a supplemental frame member hinged to the back thereof at the top thereof, means for holding said supplemental frame member in an inclined position, a telescopic frame member mounted in the main frame and adapted to be drawn out from the front thereof, a supplemental frame member hinged to the telescopic frame member, and means for holding the said last-named supplemental frame member in a horizontal position, said main frame being also provided at its opposite ends with end frame members hinged to the top thereof and means for holding said members in a horizontal or inclined position, substantially as shown and described.

4. In a device of the class described, a main oblong and rectangular frame, a supplemental frame member hinged to the back thereof at the top thereof, means for holding said supplemental frame member in an inclined position, a telescopic frame member mounted in the main frame and adapted to be drawn out from the front thereof, a supplemental frame member hinged to the telescopic frame member, and means for holding the said last-named supplemental frame member in a horizontal position, said main frame being also provided at its opposite ends with end frame members hinged to the top thereof, and means for holding said members in a horizontal or inclined position and said end frame members being also provided with sliding frames which are adapted to be telescoped thereinto and to be drawn out parallel with the ends of the main frame, substantially as shown and described.

In testimony that I claim the foregoing as my invention I have signed my name, in presence of the subscribing witnesses, this 2d day of April, 1904.

JACOB SCHWARTZMAN.

Witnesses:
F. A. STEWART,
C. E. MULREANY.